(12) United States Patent
Tober

(10) Patent No.: US 9,302,309 B2
(45) Date of Patent: Apr. 5, 2016

(54) STAMPED CARRIER

(71) Applicant: Huehoco USA, LP, Mableton, GA (US)

(72) Inventor: Mark T. Tober, Avon, OH (US)

(73) Assignee: Huehoco USA, LP, Mableton, GA (US)

( * ) Notice: Subject to any disclaimer, the term of this patent is extended or adjusted under 35 U.S.C. 154(b) by 141 days.

(21) Appl. No.: 14/015,087

(22) Filed: Aug. 30, 2013

(65) Prior Publication Data

US 2014/0072825 A1    Mar. 13, 2014

Related U.S. Application Data

(60) Provisional application No. 61/787,681, filed on Mar. 15, 2013, provisional application No. 61/708,152, filed on Oct. 1, 2012, provisional application No. 61/695,645, filed on Aug. 31, 2012.

(51) Int. Cl.
| | |
|---|---|
| *B21D 35/00* | (2006.01) |
| *B60J 10/00* | (2006.01) |
| *B60R 13/02* | (2006.01) |
| *B21D 22/00* | (2006.01) |
| *B21D 22/02* | (2006.01) |
| *B21D 31/04* | (2006.01) |

(52) U.S. Cl.
CPC .............. *B21D 35/001* (2013.01); *B21D 22/00* (2013.01); *B21D 22/02* (2013.01); *B21D 31/04* (2013.01); *B60J 10/00* (2013.01); *B60J 10/0002* (2013.01); *B60J 10/0011* (2013.01); *B60J 10/0014* (2013.01); *B60J 10/0062* (2013.01); *B60J 10/0065* (2013.01); *B60R 13/0206* (2013.01); *Y10T 428/1225* (2015.01); *Y10T 428/12361* (2015.01); *Y10T 428/12368* (2015.01); *Y10T 428/24273* (2015.01); *Y10T 428/24281* (2015.01); *Y10T 428/24298* (2015.01); *Y10T 428/24306* (2015.01); *Y10T 428/24314* (2015.01)

(58) Field of Classification Search
CPC .................. Y10T 428/12361; Y10T 428/1225; Y10T 428/12368; Y10T 428/24273; Y10T 428/24281; Y10T 428/24298; Y10T 428/24306; Y10T 428/24314
See application file for complete search history.

(56) References Cited

U.S. PATENT DOCUMENTS

| 5,783,312 | A | * | 7/1998 | Laughman | ........... B60J 10/0011 29/6.1 |
|---|---|---|---|---|---|
| 2003/0082337 | A1 | * | 5/2003 | Mizuno | ..................... B32B 3/02 428/98 |
| 2004/0108045 | A1 | * | 6/2004 | Hauser | ................ B29C 47/0028 156/181 |
| 2010/0212230 | A1 | * | 8/2010 | Ogilvie | ................ B60J 10/0011 49/490.1 |

* cited by examiner

*Primary Examiner* — Michael E La Villa
(74) *Attorney, Agent, or Firm* — McDonald Hopkins LLC

(57) ABSTRACT

An insulation carrier is comprised of a generally planar piece of material having a center section with one or more openings and two outer sections on either side of the center section each having tines extending outwardly from the inner section. The tines may have spaces therebetween. The spaces include bottleneck shaped portions.

12 Claims, 8 Drawing Sheets

STAMPED CARRIER

RELATED APPLICATIONS

This application claims priority to U.S. Provisional Application No. 61/695,645 filed on Aug. 31, 2012 and entitled "Stamped Metal Carrier," and U.S. Provisional Application No. 61/708,152 filed on Oct. 1, 2012 and entitled "Stamped Metal Carrier," and U.S. Provisional Application No. 61/787,681 filed on Mar. 15, 2013 and entitled "Stamped Metal Carrier," each of which are herein incorporated by reference.

FIELD OF INVENTION

The present invention generally relates to a stamped carrier used in weatherstripping for the automotive industry.

BACKGROUND

Automobile doors require weatherstripping for various purposes, including noise reduction and temperature control. Materials, such as foam and dense rubber and the like, are often used to seal the connection between the car door and the car body. A carrier device, such as a metal support, is commonly used to assist in mounting such weatherstripping materials to the car door and door frame.

Carriers used to support weatherstripping materials often include cutouts and various geometries which are then formed and used within the weatherstrip. Such geometries can provide for material and cost savings and assist in forming the carrier to the desired configuration to hold the weatherstripping materials in place.

Such weatherstripping material carriers are commonly manufactured through a lancing process. During the process, openings and cutouts are made by lancing the material at specified locations to form features, such as tines and gaps in the carrier material then stretched to create the desired geometry.

The lancing process, however, presents several drawbacks. For example, lancing can be less precise than other metal forming methods. Further, lancing weakens and stretches the metal at points where the metal is lanced. FIG. 1 illustrates a lanced metal carrier 10. As shown, the corners and edges 12 of the material are stretched and otherwise deformed during the lancing process, thereby weakening the material. In addition, the stretching and deforming of the material causes natural micro-fractures that further weaken the carrier material.

Therefore, an improved design and process for manufacturing a carrier for weatherstripping is needed.

SUMMARY

A carrier is generally presented. The carrier may comprise a generally planar piece of material having a center section and two outer sections on either side of the center section. The center section may include one or more openings therein. The outer sections may include one or more tines extending from the inner section. The tines may have spaces therebetween.

In an embodiment, the spaces between the tines may include a generally bottleneck shaped portion. The bottleneck shaped portion may include a first section having a top surface approximately parallel to a bottom surface, a second section having a tapered shape, and a third section having a rounded end. The top and bottom surfaces of the third section may be approximately parallel to one another up to the rounded end.

In an embodiment, the carrier may be formed through a stamping process. The stamping process may allow the carrier to maintain tight tolerances for features of carrier, such as desired radiuses. In an embodiment, the stamped radius of the rounded end may be held to a minimum of 0.38 millimeters.

BRIEF DESCRIPTION OF THE DRAWINGS

The operation of the invention may be better understood by reference to the detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Figure 2:
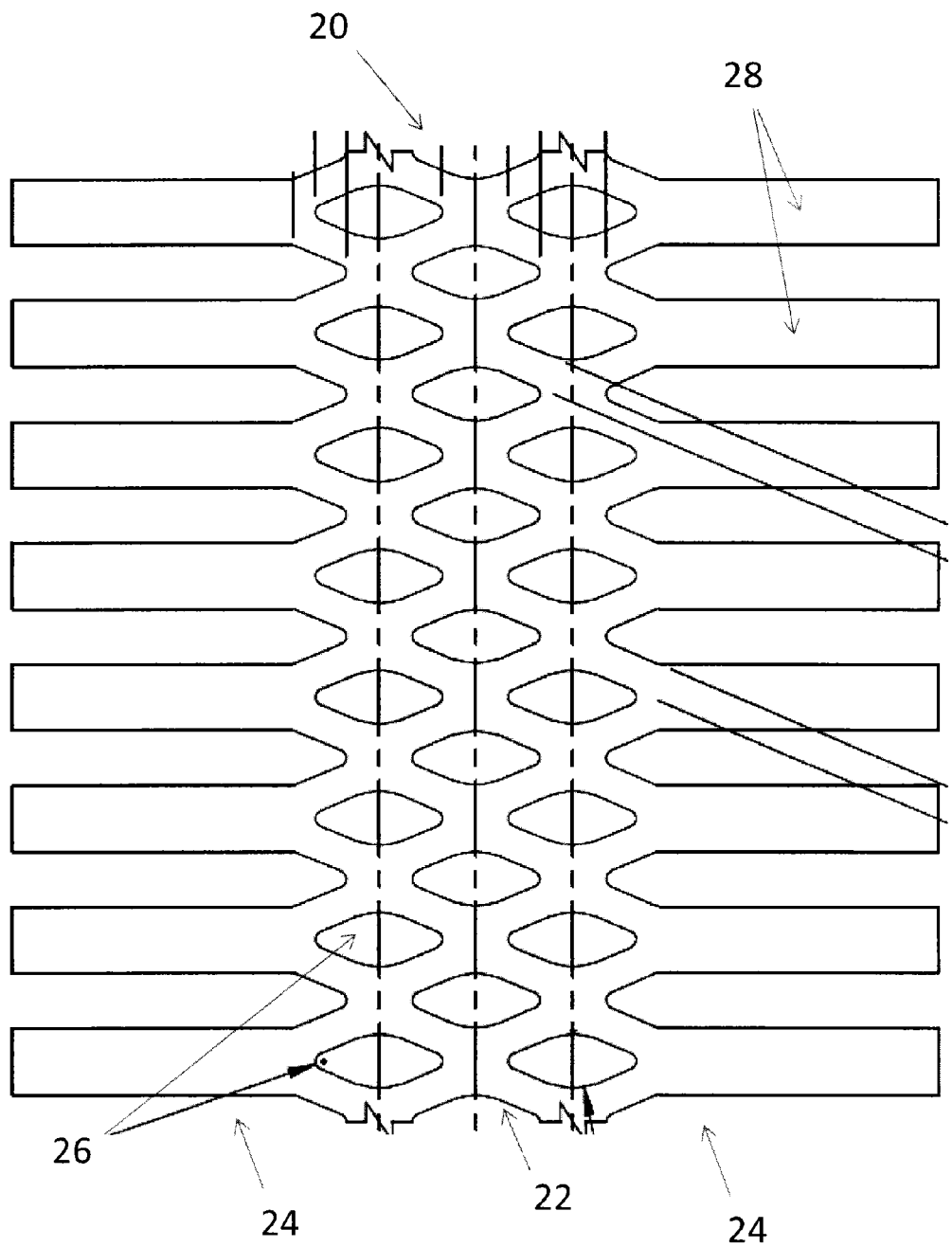
FIG. 2 is a stamped carrier.
Figure 3:
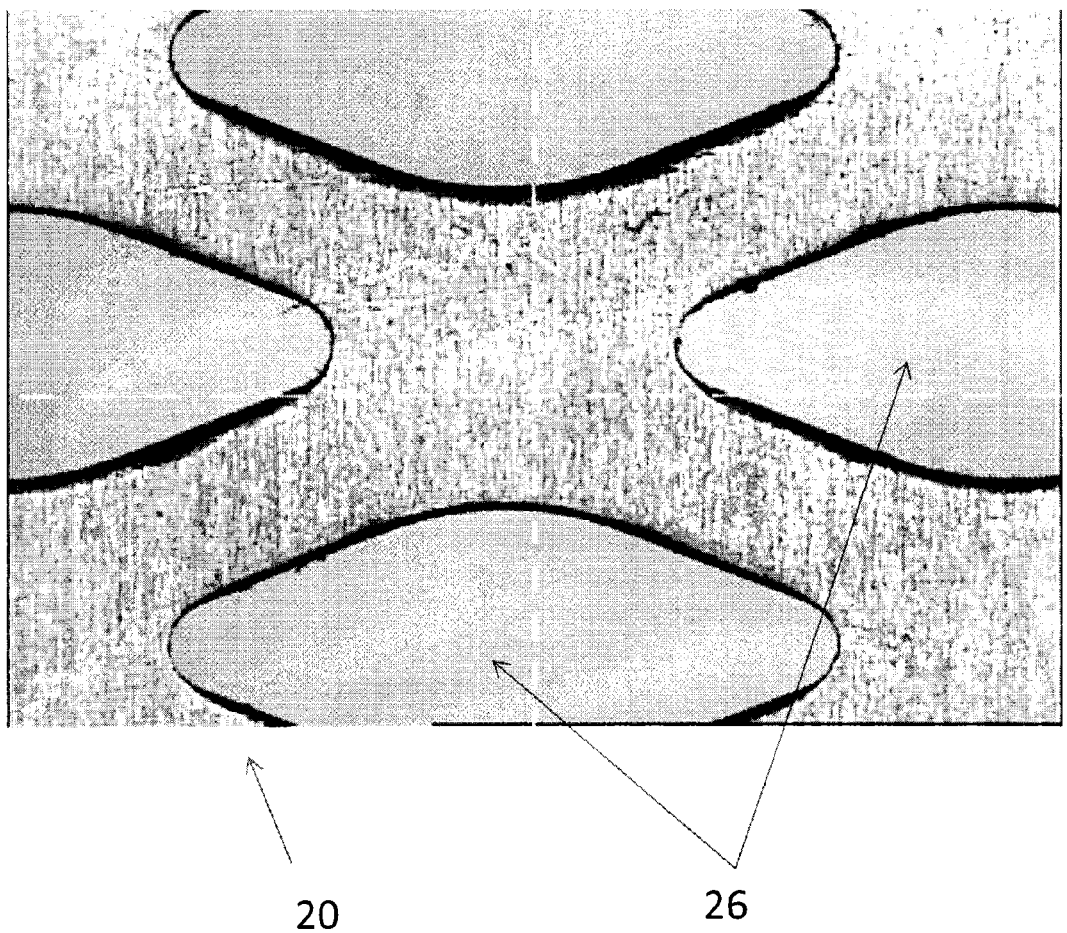
FIG. 3 is a rectangular shaped stamped feature in a carrier.
Figure 4:
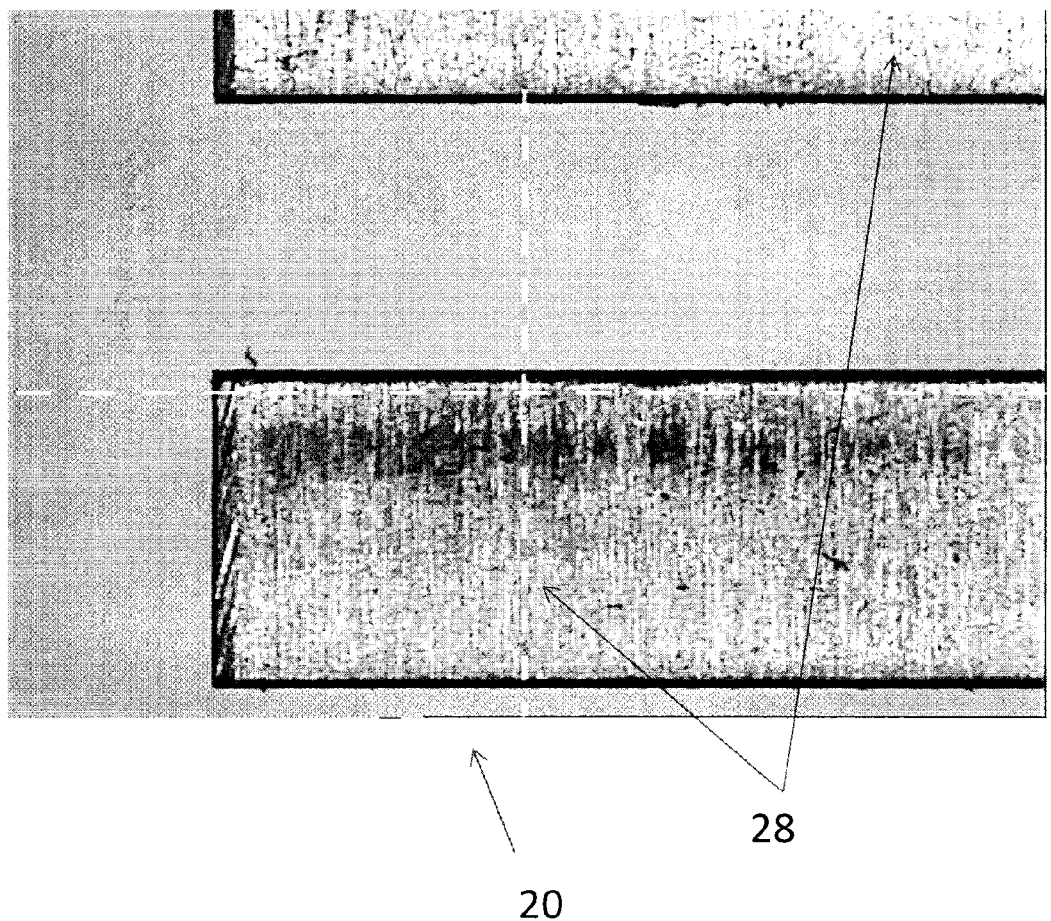
FIG. 4 is a diamond shaped stamped feature in a carrier.

A weatherstripping carrier 20 is generally provided, as illustrated in FIGS. 2-4. The weatherstripping carrier 20 may be adapted to receive and hold insulation material, such as rubber, foam rubber or the like, at a desired location. The carrier 20 may further be adapted to be attached to portions of a car door or car door frame.

The carrier 20 may be made out of any appropriate material, such as metal. In an embodiment, the carrier 20 may be formed out of strip steel, such as cold rolled strip steel.

The carrier 20 may be a generally planar piece and include a center section 22 and two outer sections 24 positioned on either side of the center section 22. The outer sections 24 may be formable with respect to the center section 22 to produce the desired shape of the carrier 20. For example, the two outer sections 24 may be bent with respect to the center section 22 to form a u-channel carrier. The outer sections 24 may be bent to a desired angle in order to retain material, such as insulation material, within the u-channel.

The center section 22 may include a plurality of openings 26. The openings 26 may reduce the weight of the carrier 20 and provide material savings. The openings 26 may be any appropriate size and shape, such as diamond shaped as illustrated in FIGS. 2 and 3.

Figure 1:
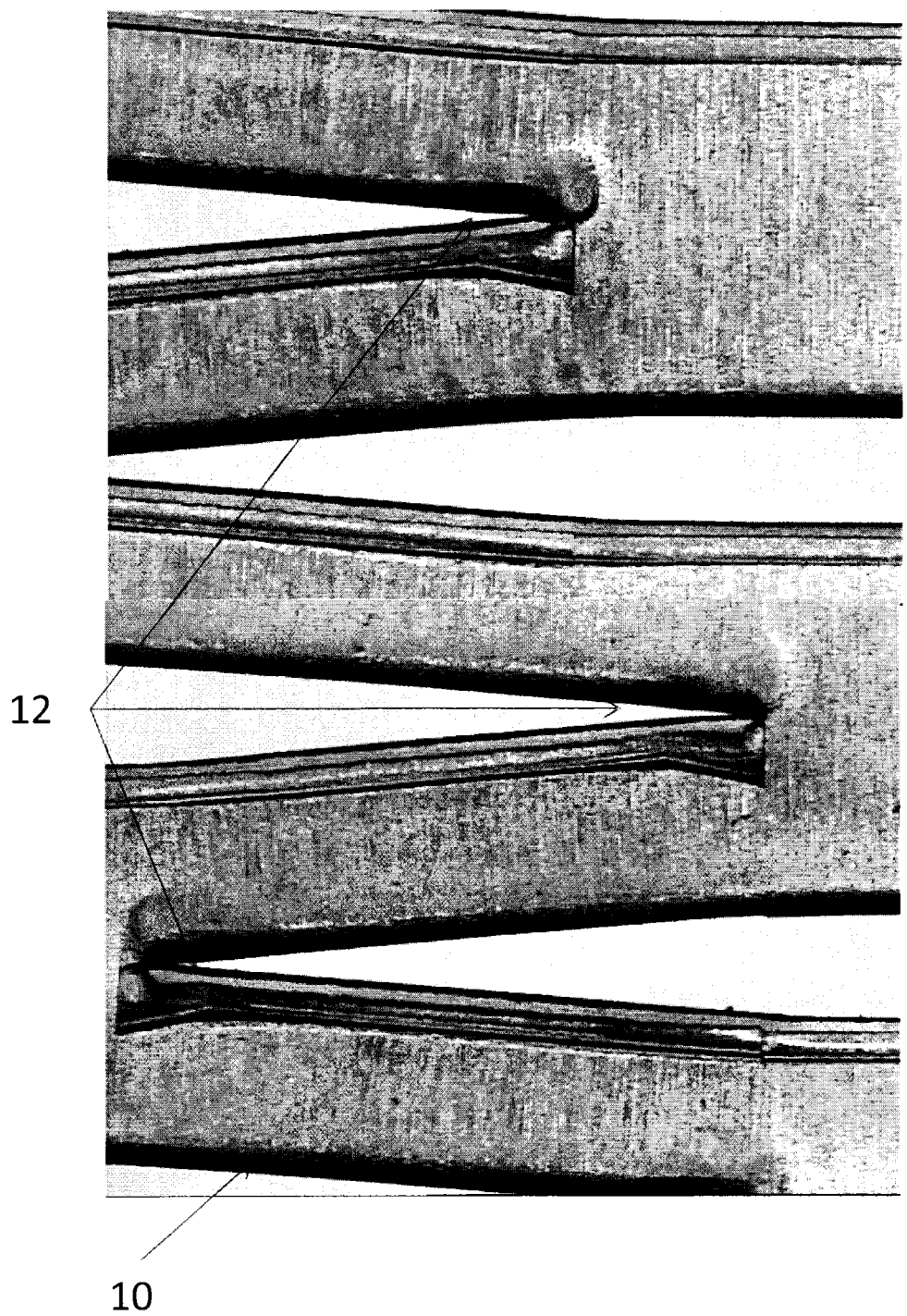
FIG. 1 is a carrier having lanced features.

The openings 26 may be formed in the carrier 20 using any appropriate method. In prior art designs, carrier features, such as the openings 26, are commonly formed by lancing the material. As shown in FIG. 1, however, this process is prone to causing stretching in the carrier material that leads to micro-fracturing and other undesirable effects. To avoid such undesirable effects, the openings 26 may be formed using a stamping process. FIG. 3 illustrates a stamped diamond feature 26. As shown, the stamping process allows for better control of tolerances related to the specifications of the openings 26. Further, as compared with other processes such as lancing, the stamping process prevents stretching and allows for greater consistency with respect to the shape and thickness of the carrier material. Moreover, while lancing is largely limited to forming diamond shaped openings, the stamping process may allow for a variety of opening shapes through tooling changes.

The outer sections 24 may each include a plurality of tines 28. The tines may comprise fingers extending from the center section 22 and having spaces arranged therebetween. The tines 28 may reduce the weight of the carrier 20 and assist in holding the insulation material at the desired position. The tines 28 may be any appropriate size and shape, such as generally rectangular, as illustrated in FIG. 2.

The tines 28 may be formed in the carrier 20 using any appropriate method. For example, as illustrated in FIG. 4, the spaces between the tines 28 may be stamped out of the carrier material. By using a stamping process, the spaces between the tines may be any desired shape, such as generally rectangular. The stamping process may allow the shape of the space to be easily changed by changing the stamping tool. As described above, the stamping process further allows for greater control of tolerances related to the specifications of the carrier features, such as the tines 28, and prevents stretching an other unwanted effects caused by other processes while maintaining the consistency of the material thickness and shape. As shown in FIG. 4, the stamped tines do not suffer from stretching or other undesirable effects.

In use, the carrier 20 may be formed out of strip metal, such as aluminum or steel. The appropriate tooling of a stamping press may be selected to produce the desired shapes for the openings 26 and tines 28. The aluminum or steel strip may be inserted into the stamping press. The openings 26 may then be stamped in the center section 22 and the spaces between the tines 28 may be stamped in the outer sections 24.

The stamped carrier 20 may have a higher and more consistent tensile strength than a lanced carrier. The tensile strength may measure the force required to pull the carrier until it yields or breaks. The chart below illustrates test results for given stamped materials and the average tensile strength of each material.

| Material | Tensile Strength Results (Kg) | | | | | | | | | | |
|---|---|---|---|---|---|---|---|---|---|---|---|
| | T1 | T2 | T3 | T4 | T5 | T6 | T7 | T8 | T9 | T10 | AVG |
| 0.5 mm 1010 Steel | 75.3 | 75.1 | 74.6 | 74.6 | 75 | 74.9 | 74.8 | 74.8 | 75.3 | 75.4 | 74.98 |
| 0.5 mm 5052 Aluminum | 29.2 | 29.2 | 29.2 | 28.9 | 29.1 | 29 | 29.3 | 29.2 | 29.2 | 29.3 | 29.16 |
| 0.78 mm 5052 Aluminum | 48.7 | 48.4 | 47.5 | 49 | 49 | 47.6 | 48.1 | 48 | 48.9 | 47.7 | 48.29 |

Weatherstripping material, such as foam or dense rubber, may be attached to the carrier 20. For example, the weatherstripping material may be glued, fastened or otherwise fixed to the center section 22. The outer sections 24 may be bent to form a u-channel, such that the tines 28 hold the insulation material in place. The carrier 20 and insulation material may be fixed to a portion of a car door or a car door frame.

Figure 5:
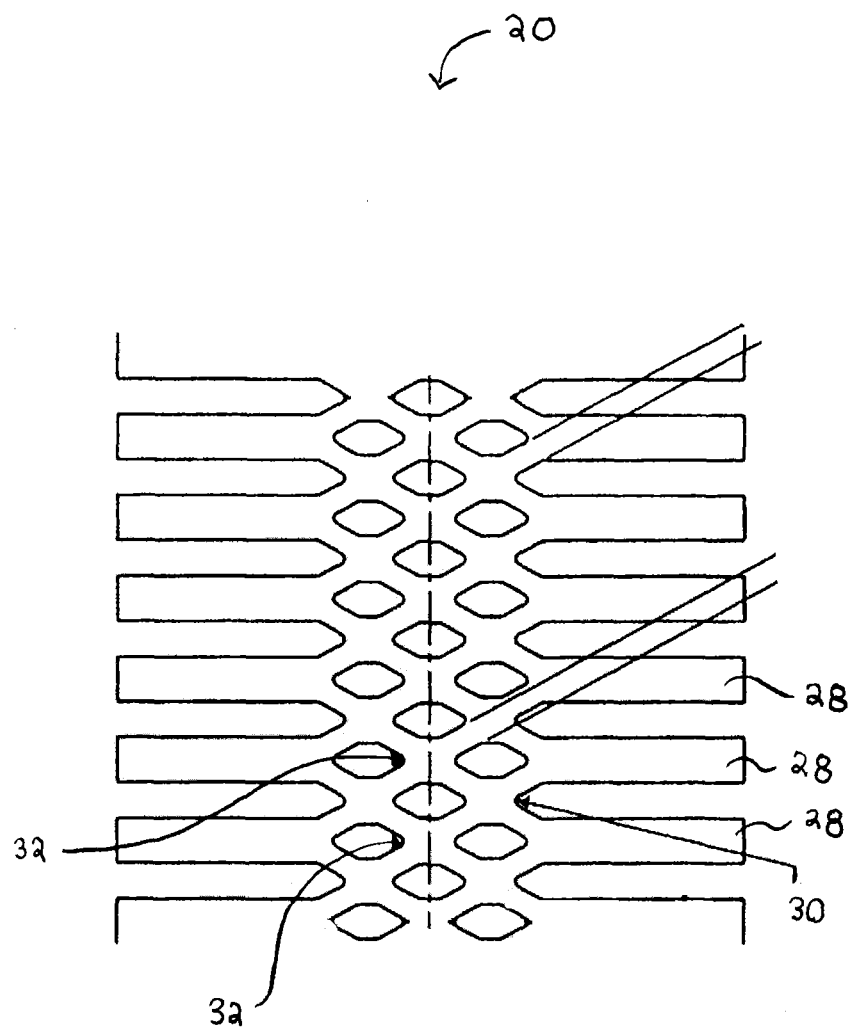
FIG. 5 is a stamped carrier having minimum radius features.

In an embodiment, as illustrated in FIG. 5, the stamped carrier 20 may include a rounded portion 30 at the space or gap between the tines 28. The rounded portion 30 may be located at an inner side wall of the gap, or the interconnection of adjacent tines 28. The rounded portion 30 may be stamped in order to achieve a desired radius. The stamping process may allow the radius of the portion 30 to be maintained at a desired minimum value, such as a radius of 0.38 millimeters. Likewise, each of the openings 26 may include one or more rounded portions 32. The rounded portions 32 may be stamped in order to achieve a desired radius. The stamping process may allow the radius of the portion 32 to be maintained at a desired minimum value, such as a radius of 0.38 millimeters. The 0.38 millimeter radius may be the smallest radius that can be achieved without causing damage to the stamping tool.

Figure 6:
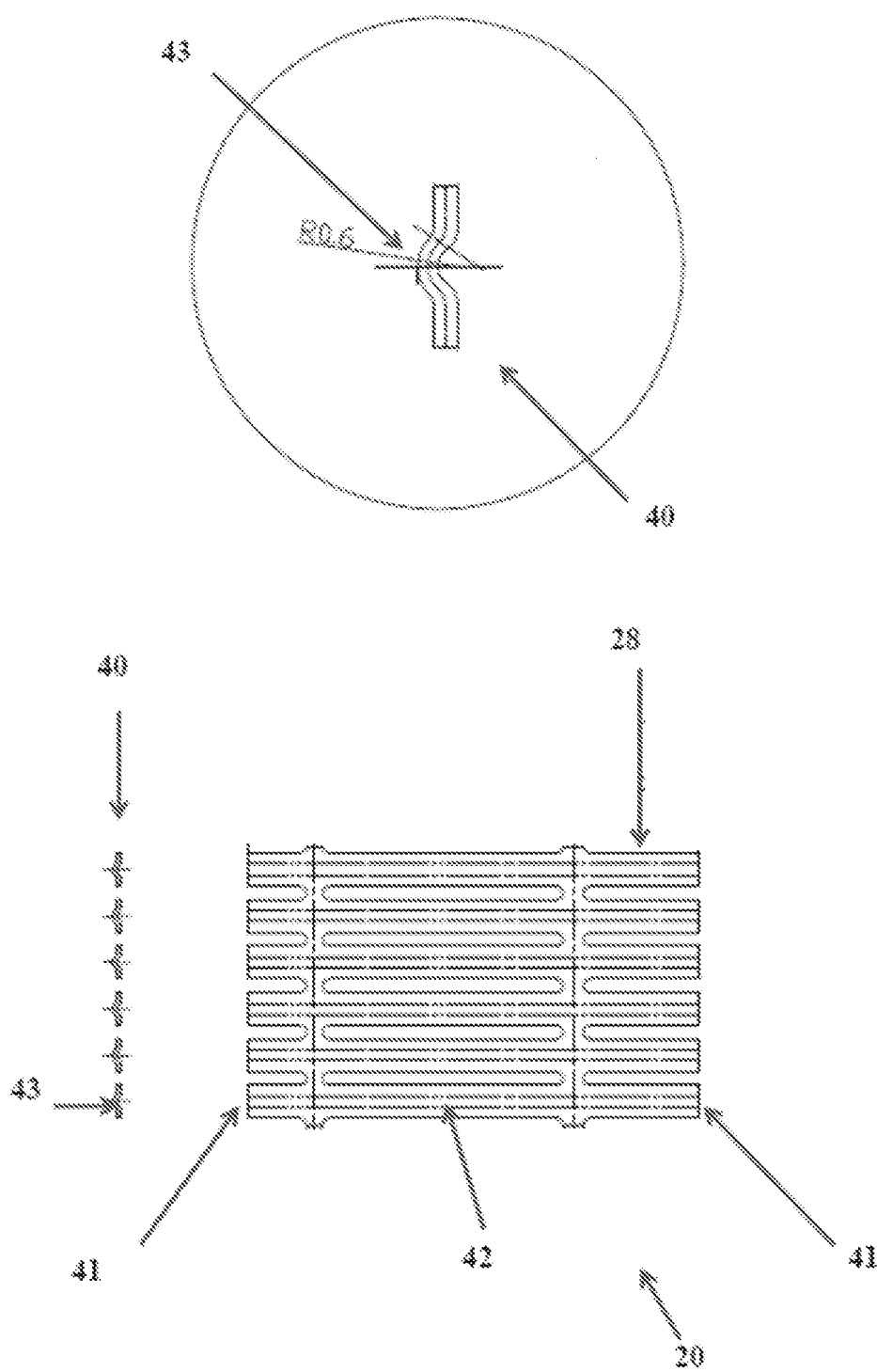
FIG. 6 is a stamped carrier having reinforcing ribs.

In another embodiment, as illustrated in FIG. 6, carrier 20 may include one or more ribs 40. Including one or more ribs increases the strength of carrier 20 and makes tines 28 more resistant to bending and other forces without significantly increasing the overall weight of carrier 20. Ribs 40 may be located along the front side (inside of the u-channel after bending), backside (outside of the u-channel after bending), or both sides of one or more tines 28. Ribs 40 may be attached to tines 28 by stamping or by other appropriate means known in the art. Rib 40 may extend any length of a tine 28, including the entire length from leading edge 41 to leading edge 41 of the corresponding tine on the opposite side of carrier 20. As shown in the FIG. 6 inset, Rib 40 may have a protruding portion 43, shaped parabolically or in some other geometric shape or pattern, with carrier 20 having a corresponding indent 42 adapted to receive protruding portion 43.

Figure 7:
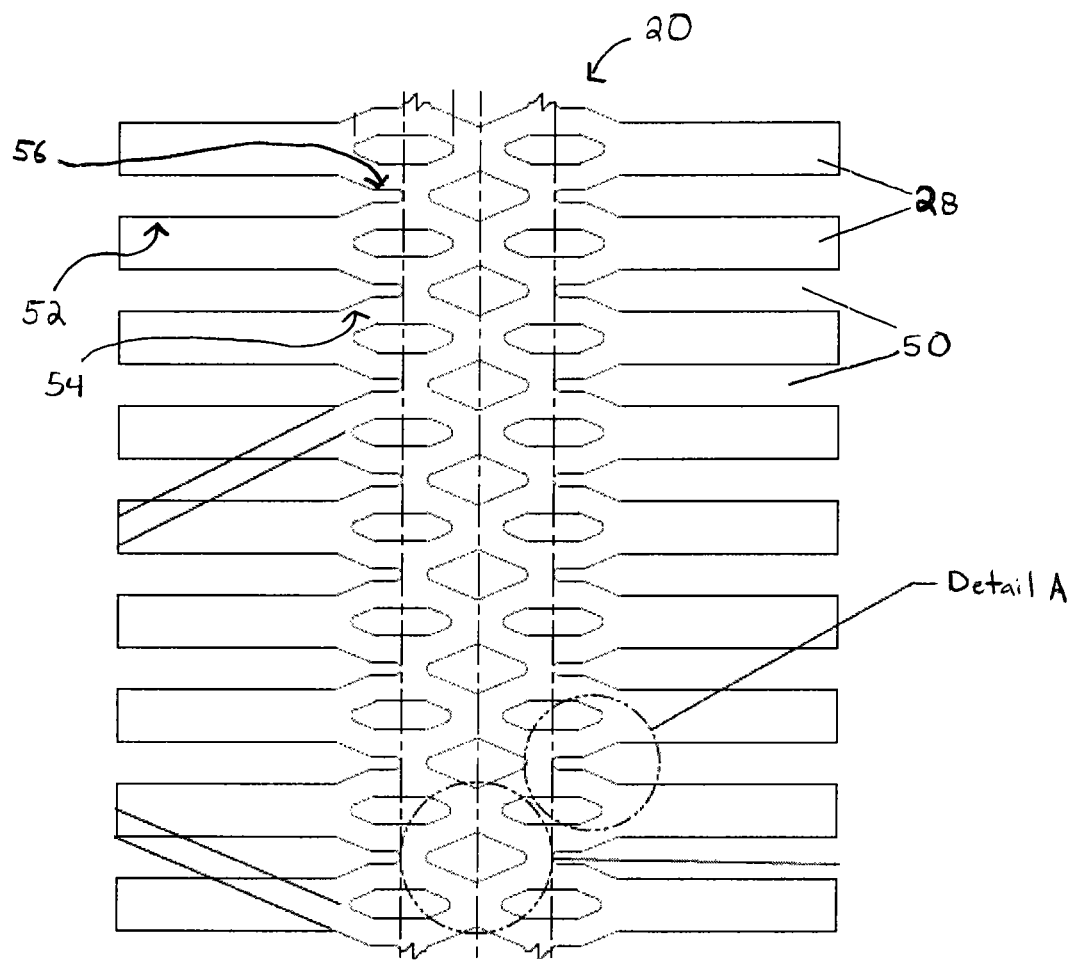
FIG. 7 is a stamped carrier having bottleneck shaped spaces between the tines.
Figure 8:
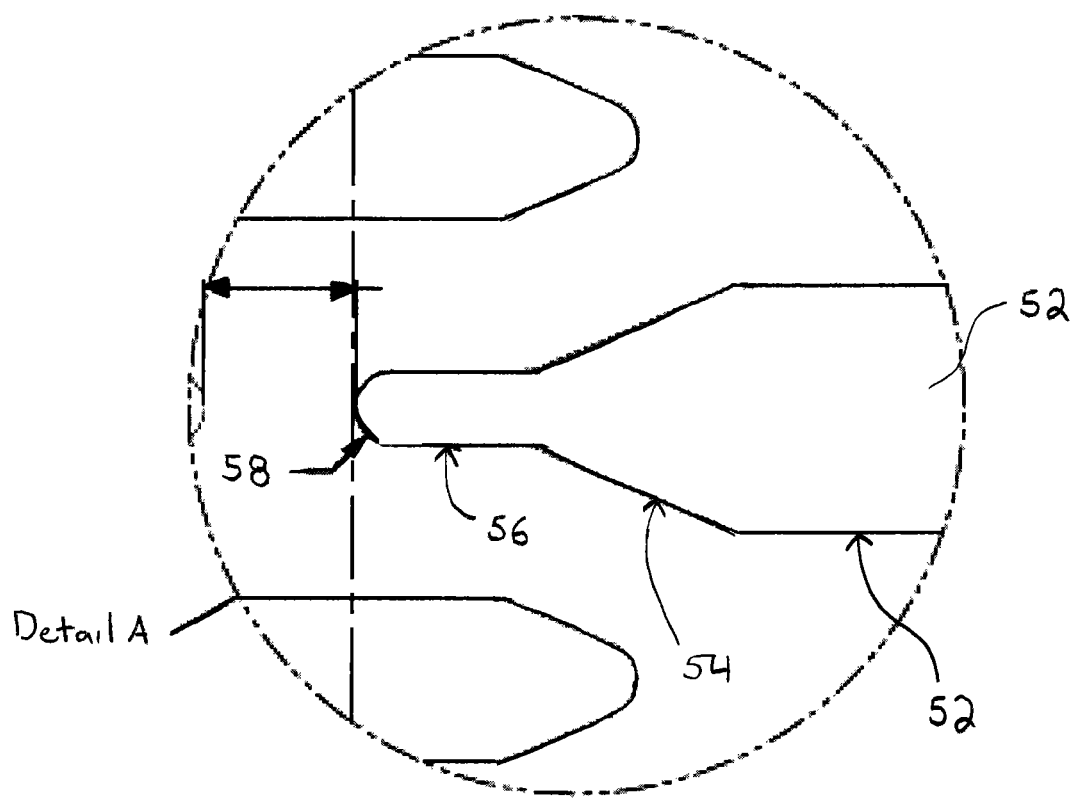
FIG. 8 is a detailed view of a bottleneck shaped space.

In an embodiment, the spaces between the tines 28 may be formed or configured to include a bottleneck shaped opening 50. The bottleneck shaped opening 50 may help to maintain the strength and reduce the brittleness of the carrier 20. As shown in FIGS. 7 and 8, the bottleneck shaped openings 50 may include three sections. The first section 52 may be generally rectangular or linear, having a generally linear top surface and bottom surface that are generally parallel to one another. The first section 52 may begin at the outer edge of the carrier 20 and extend for a distance toward the interior of the carrier 20. The second section 54 may be adjacent to the first section 52 and may be generally tapered, comprising an angled upper surface and an angled lower surface, tapering inward toward the center of the carrier 20. The third section 56 may be adjacent to the second section 54 and may be generally rectangular or linear having a rounded or radiused end 58. The top and bottom surfaces of the third section may be generally parallel to one another and may form a protrusion extending between the openings 26. The rounded end 58 may be located at the inner end of the opening 50.

The rounded end 58 may be maintained at a desired minimum value, such as a radius of 0.38 millimeters. In an embodiment, the rounded end 58 may be stamped in order to achieve the desired radius. The stamping process may allow the radius to be maintained at the desired minimum value, such as a radius of 0.38 millimeters. The 0.38 millimeter radius may be the smallest radius that can be achieved without causing damage to the stamping tool.

As described above, the carrier 20 may be fabricated using a stamping process. In the stamping process, a sheet of material such as metal, or rolled steel, is provided. The material may be cut or trimmed to a desired size and shape. The material may then be inserted into a stamping press or machine to be stamped. The stamping press may include tooling having geometries matching those of the spaces and geometries described above and shown in FIGS. 1-8. The stamping press may then use the tooling to stamp out the openings 26 and the spaces between the tines 28 to form the carrier 20.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, we claim:

1. A carrier comprising:
   a sheet of material comprising:
      a center section including one or more openings in said material;
      a first outer section on a first side of said center section, the first outer section including a plurality of tines extending from said center section and having spaces located between said tines;
      a second outer section on a second side of said center section, the second outer section including a plurality of tines extending from said center section and having spaces located between said tines; and
      wherein said spaces between said tines include a bottleneck shaped portion;
      wherein said bottleneck shaped portion of said spaces include three sections comprising:
         a first section having a top edge parallel to a bottom edge;
         a second section adjacent to said first section and having a tapered shape; and
         a third section adjacent to said second section and having a rounded end.

2. The carrier of claim 1, wherein said material is cold rolled steel.

3. The carrier of claim 1, wherein said rounded end includes a radius of 0.38 millimeters.

4. The carrier of claim 1, wherein said third section includes a top edge parallel to a bottom edge.

5. The carrier of claim 1, wherein the third section protrudes between openings in said center section.

6. The carrier of claim 1, wherein said openings and spaces are formed by a stamping process.

7. A carrier comprising:
   a planar piece of material comprising:
      a center section including one or more openings in said material;
      a first outer section on a first side of said center section, the first outer section including a plurality of tines extending from said center section and having spaces located between said tines;
      a second outer section on a second side of said center section, the second outer section including a plurality of tines extending from said center section and having spaces located between said tines;
      one or more ribs protruding from a surface of said carrier; and
      wherein said spaces between said tines include a bottleneck shaped portion;
      wherein said bottleneck shaped portion of said spaces include three sections comprising:
         a first section having a top edge parallel to a bottom edge;
         a second section adjacent to said first section and having a tapered shape; and
         a third section adjacent to said second section and having a rounded end.

8. The carrier of claim 7, wherein said one or more ribs extend from an edge of said first outer section to an edge of said second outer section.

9. The carrier of claim 7, wherein said one or more ribs have a parabolic cross-sectional shape.

10. The carrier of claim 7, wherein said one or more ribs are formed by a stamping process.

11. The carrier of claim 7, wherein said material is cold rolled steel.

12. The carrier of claim 7, wherein said rounded end portion includes a radius of 0.38 millimeters.

* * * * *